(12) United States Patent
Abdellatif et al.

(10) Patent No.: US 12,350,962 B2
(45) Date of Patent: *Jul. 8, 2025

(54) ELECTROMAGNETS TO CONTROL MAGNETIC WHEEL ADHESION

(71) Applicant: Saudi Arabian Oil Company, Dhahran (SA)

(72) Inventors: Fadl Abdellatif, Thuwal (SA); Amjad Felemban, Thuwal (SA); Ali J. Alrasheed, Thuwal (SA); Hesham Jifri, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 574 days.

This patent is subject to a terminal disclaimer.

(21) Appl. No.: 17/663,455

(22) Filed: May 16, 2022

(65) Prior Publication Data
US 2023/0364943 A1 Nov. 16, 2023

(51) Int. Cl.
*B60B 19/00* (2006.01)
*B60B 3/08* (2006.01)
(Continued)

(52) U.S. Cl.
CPC .............. *B60B 19/006* (2013.01); *B60B 3/08* (2013.01); *B60B 27/02* (2013.01); *H01F 7/0231* (2013.01); *B60B 2360/00* (2013.01)

(58) Field of Classification Search
CPC ................................ B60B 19/006; B60B 3/08
See application file for complete search history.

(56) References Cited

U.S. PATENT DOCUMENTS

| 3,690,393 | A | 9/1972 | Guy |
| 7,492,074 | B1 | 2/2009 | Rittenhouse |

(Continued)

FOREIGN PATENT DOCUMENTS

| CA | 3059845 A1 | 4/2020 |
| CN | 111942163 A | 11/2020 |

(Continued)

OTHER PUBLICATIONS

Andres San-Millan; Design of a teleoperated wall climbing robot for oil tank inspection; https://www.researchgate.net/publication/284285242_Design_of_a_teleoperated_wall_climbing_robot_for_oil_tank_inspection; Jul. 2015; 8 pages.

(Continued)

*Primary Examiner* — Jason R Bellinger
(74) *Attorney, Agent, or Firm* — Leason Ellis LLP

(57) ABSTRACT

An arrangement of cancellation electromagnets control magnetic adhesion of a wheel to a surface. The wheel has an inner annular disc composed of a non-magnetic material with apertures which retain electromagnets and permanent magnets, and an outer annular disc composed of a ferromagnetic material which is disposed on a side of the inner annular disc, with a non-magnetic isolator ring having curves extending in a serpentine manner. In one embodiment, the curves isolate the electromagnets from the permanent magnets. In another embodiment, the outer annular disc is rotated relative to the inner annular disc to dispose the curves of the serpentine isolator ring in a second position to allow magnetic interaction between the electromagnets and the permanent magnets to generate a second magnetic flux between the permanent magnets and the ferromagnetic surface which decreases adhesion of the wheel to the ferromagnetic surface. A method implements the system.

20 Claims, 6 Drawing Sheets

(51) Int. Cl.
*B60B 27/02* (2006.01)
*H01F 7/02* (2006.01)

(56) References Cited

U.S. PATENT DOCUMENTS

| | | | |
|---|---|---|---|
| 8,522,905 | B2 | 9/2013 | Lama |
| 9,973,066 | B2 | 5/2018 | Tchervenkov et al. |
| 10,830,837 | B2 * | 11/2020 | Oetiker ............... G01R 33/02 |
| 2005/0099081 | A1 | 5/2005 | Obidniak |
| 2009/0078484 | A1 | 3/2009 | Kocijan |
| 2019/0271569 | A1 | 9/2019 | Ganser et al. |
| 2020/0094618 | A1 * | 3/2020 | La .......................... B60C 11/14 |
| 2023/0339262 | A1 * | 10/2023 | Abdellatif ............ B62D 57/024 |
| 2023/0356543 | A1 * | 11/2023 | Abdellatif ............. B60B 19/006 |
| 2023/0356544 | A1 * | 11/2023 | Abdellatif ............. B60B 19/006 |
| 2023/0364940 | A1 * | 11/2023 | Halawani .............. B60B 19/006 |
| 2023/0364941 | A1 * | 11/2023 | Abdellatif ................ B60B 3/00 |
| 2023/0364942 | A1 * | 11/2023 | Abdellatif ............. B60B 19/006 |

FOREIGN PATENT DOCUMENTS

| | | |
|---|---|---|
| JP | 2011172432 A | 9/2011 |
| KR | 101129898 B1 | 3/2012 |
| WO | 1995010134 A1 | 4/1995 |
| WO | 1999048187 A1 | 9/1999 |
| WO | 2014104423 A1 | 7/2014 |

OTHER PUBLICATIONS

Kiaojun Zhang, et al.; Optimization Design and Flexible Detection Method of Wall-Climbing Robot System with Multiple Sensors Integration for Magnetic Particle Testing; https://www.mdpi.com/1424-8220/20/16/4582/htm; Aug. 15, 2020; 19 pages.

Office Action in corresponding SA Application No. 123447086 dated Oct. 16, 2024; 7 pages.

* cited by examiner

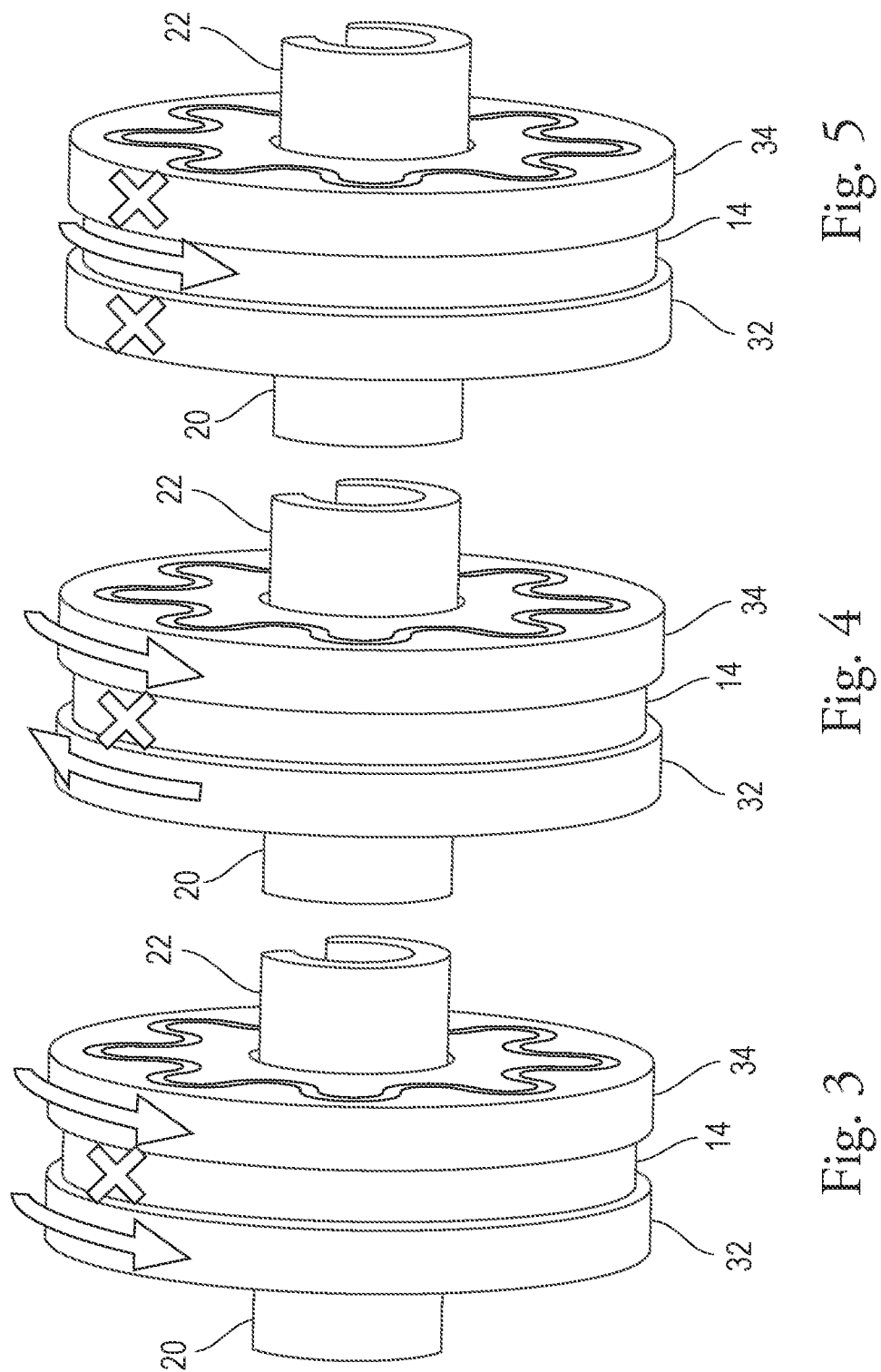

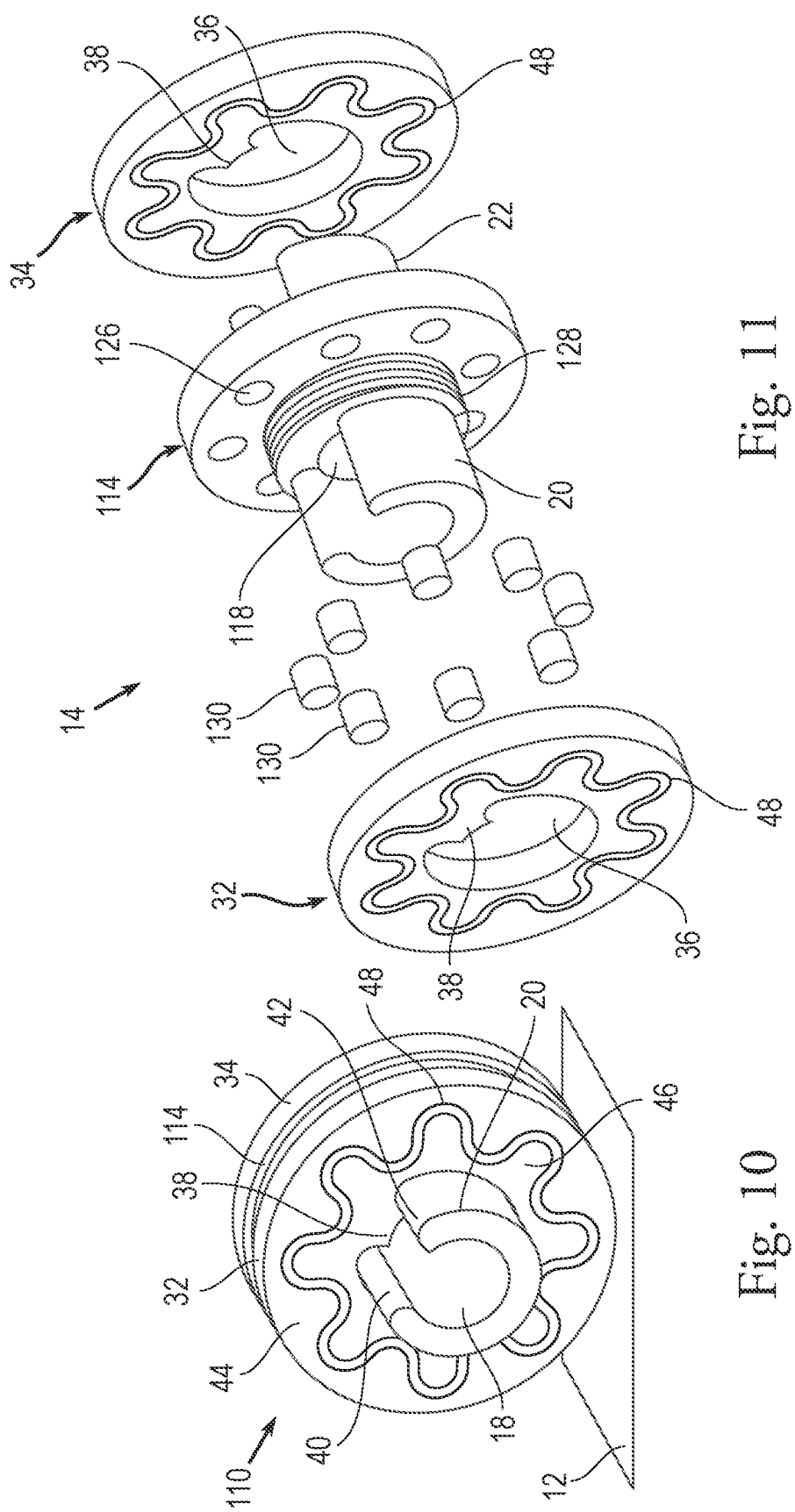

ELECTROMAGNETS TO CONTROL MAGNETIC WHEEL ADHESION

FIELD OF THE DISCLOSURE

The present disclosure relates generally to magnetized wheels, and, more particularly, to a system and method using cancellation electromagnets to control magnetic adhesion of a wheel to a ferromagnetic surface.

BACKGROUND OF THE DISCLOSURE

Magnetic wheels enable vehicles to climb and drive on ferromagnetic structures. For example, an unmanned aerial vehicle (UAV) can fly to a point on a ferromagnetic structure, perch at that point, and utilize magnetic wheels to adhere to the ferromagnetic structure. The magnetic adhesion is the result of magnetic flux passing through the surface from the magnet north pole to the magnetic south pole of a magnet in the wheel. Having a strong magnetic grip to the ferromagnetic surface is essential to prevent the vehicle from disengaging inadvertently and from falling from the ferromagnetic surface. However, a strong pulling force is required to overcome the magnetic adhesion to disengage the vehicle from the ferromagnetic surface. In order to enable vehicles to obtain a strong magnetic grip as well as easy disengagement, incorporation of a magnetic switch into the wheel is desirable.

SUMMARY OF THE DISCLOSURE

According to an embodiment consistent with the present disclosure, a system and method using cancellation electromagnets to control magnetic adhesion of a wheel to a ferromagnetic surface.

In an embodiment, the wheel is configured to adhere magnetically to a ferromagnetic surface and comprises an inner annular disc and a pair of outer annular discs. The inner annular disc is composed of a non-magnetic material and has a first outer circumferential periphery, a first central axial bore, a first plurality of apertures, and a second plurality of apertures. The first central axial bore is configured to retain an axle. The first plurality of apertures are disposed adjacent to the central axial bore and are configured to retain a first plurality of magnets, wherein each of the first plurality of magnets is an electromagnet. The second plurality of apertures are disposed adjacent to the outer circumferential periphery and are configured to retain a second plurality of magnets The pair of outer annular discs are composed of a ferromagnetic material and are disposed on either side of the inner annular disc. Each outer annular disc has a second outer circumferential periphery, a second central axial bore, an inner circumferential periphery, and an isolator ring. The second central axial bore is configured to retain an axle. The inner circumferential periphery is disposed adjacent to the second central axial bore. The isolator ring is composed of a non-magnetic material and defines a plurality of loops disposed between the inner circumferential periphery and the second outer circumferential periphery In a first configuration, the plurality of loops are disposed in a first position relative to the second plurality of magnets to isolate the first plurality of magnets from the second plurality of magnets, thereby generating a first magnetic flux between the second plurality of magnets and the ferromagnetic surface to increase the adhesion of the wheel to the ferromagnetic surface. In a second configuration, at least one outer annular disc is rotated about the axle relative to the inner annular disc to dispose the plurality of loops in a second position relative to the second plurality of magnets to allow magnetic interaction between the first plurality of magnets and the second plurality of magnets, thereby generating a second magnetic flux between the second plurality of magnets and the ferromagnetic surface to decrease the adhesion of the wheel to the ferromagnetic surface. The second magnetic flux is less than the first magnetic flux.

Each of the first plurality of magnets has a first polarity, and each of the second plurality of magnets has a second polarity opposite to the first polarity. In the second configuration, the first plurality of magnets at least partially cancels the magnetic flux of the second plurality of magnets. The second plurality of magnets can be permanent magnets. The first and second pluralities of apertures can be cylindrical. Each of the first plurality of magnets can be cylindrical. Each of the second plurality of magnets can be cylindrical.

In another embodiment, a wheel is configured to adhere magnetically to a ferromagnetic surface and comprises a first annular disc and a second annular disc. The first annular disc is composed of a non-magnetic material and has a first outer circumferential periphery, a first central axial bore, a first plurality of apertures, and a second plurality of apertures. The first central axial bore is configured to retain an axle. The first plurality of apertures are disposed adjacent to the central axial bore and are configured to retain a first plurality of magnets, wherein each of the first plurality of magnets is an electromagnet. The second plurality of apertures are disposed adjacent to the outer circumferential periphery and are configured to retain a second plurality of magnets.

The second annular disc is composed of a ferromagnetic material and is disposed on one side of the first annular disc. The second annular disc has a second outer circumferential periphery, a second central axial bore, an inner circumferential periphery, and an isolator ring. The second central axial bore is configured to retain an axle. The inner circumferential periphery is disposed adjacent to the second central axial bore. The isolator ring is composed of a non-magnetic material and defines a plurality of loops disposed between the inner circumferential periphery and the second outer circumferential periphery.

In a first configuration, the plurality of loops are disposed in a first position relative to the second plurality of magnets to isolate the first plurality of magnets from the second plurality of magnets, thereby generating a first magnetic flux between the second plurality of magnets and the ferromagnetic surface to increase the adhesion of the wheel to the ferromagnetic surface. In a second configuration, the second annular disc is rotated about the axle relative to the first annular disc to dispose the plurality of loops in a second position relative to the second plurality of magnets to allow magnetic interaction between the first plurality of magnets and the second plurality of magnets, thereby generating a second magnetic flux between the second plurality of magnets and the ferromagnetic surface to decrease the adhesion of the wheel to the ferromagnetic surface. The second magnetic flux is less than the first magnetic flux.

Each of the first plurality of magnets has a first polarity, and each of the second plurality of magnets has a second polarity opposite to the first polarity. In the second configuration, the first plurality of magnets at least partially cancels the magnetic flux of the second plurality of magnets. The second plurality of magnets can be permanent magnets. The first and second pluralities of apertures can be cylindrical. Each of the first plurality of magnets can be cylindrical. Each of the second plurality of magnets can be cylindrical.

In a further embodiment, a method of adhering a wheel magnetically to a ferromagnetic surface comprises providing a wheel having a first annular disc and a second annular disc. The first annular disc is composed of a non-magnetic material and has a first outer circumferential periphery, a first central axial bore, a first plurality of magnets, and a second plurality of magnets. The first central axial bore is configured to retain an axle. The first plurality of apertures are disposed adjacent to the central axial bore and are configured to retain a first plurality of magnets, wherein each of the first plurality of magnets is an electromagnet. The second plurality of apertures are disposed adjacent to the outer circumferential periphery and are configured to retain a second plurality of magnets.

The second annular disc is composed of a ferromagnetic material and is disposed on one side of the first annular disc. The second annular disc has a second outer circumferential periphery, a second central axial bore, an inner circumferential periphery, and an isolator ring. The second central axial bore is configured to retain an axle. The inner circumferential periphery is disposed adjacent to the second central axial bore. The isolator ring is composed of a non-magnetic material and defines a plurality of loops disposed between the inner circumferential periphery and the second outer circumferential periphery.

The method also comprises disposing the first and second annular discs in a first configuration wherein the plurality of loops are disposed in a first position relative to the second plurality of magnets, isolating the first plurality of magnets magnetically from the second plurality of magnets, and generating a first magnetic flux between the second plurality of magnets and the ferromagnetic surface thereby increasing the adhesion of the wheel to the ferromagnetic surface.

The method further comprises disposing the first and second annular discs in a second configuration, wherein the second annular disc is rotated about the axle relative to the first annular disc, disposing the plurality of loops in a second position relative to the second plurality of magnets, allowing magnetic interaction between the first plurality of magnets and the second plurality of magnets, and generating a second magnetic flux between the second plurality of magnets and the ferromagnetic surface to decrease the adhesion of the wheel to the ferromagnetic surface, wherein the second magnetic flux is less than the first magnetic flux.

Each of the first plurality of magnets has a first polarity, and each of the second plurality of magnets has a second polarity opposite to the first polarity. The second plurality of magnets can be permanent magnets. The first and second pluralities of apertures can be cylindrical. Each of the first plurality and second plurality of magnets can be cylindrical.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 3 illustrates outer discs of the wheel of FIG. 1 rotating in a common direction relative to an inner disc.

FIG. 4 illustrates the outer discs of the wheel of FIG. 1 rotating in opposite directions relative to the inner disc.

FIG. 5 illustrates the inner disc of the wheel of FIG. 1 rotating relative to both of the outer discs.

FIGS. 10-11 illustrate an alternative embodiment of the wheel of FIGS. 1-2.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method using cancellation electromagnets to control magnetic adhesion of a wheel to a ferromagnetic surface.

Figure 2:
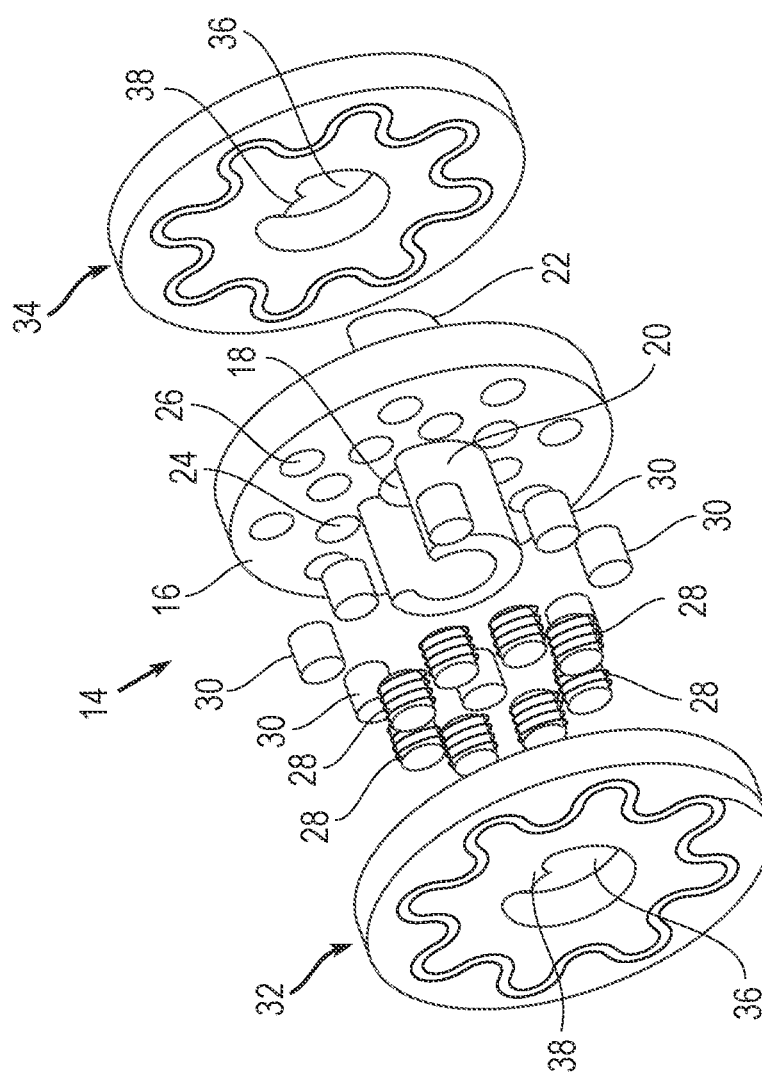
FIG. 2 is a diagram of the wheel of FIG. 1 with parts separated.
Figure 1:
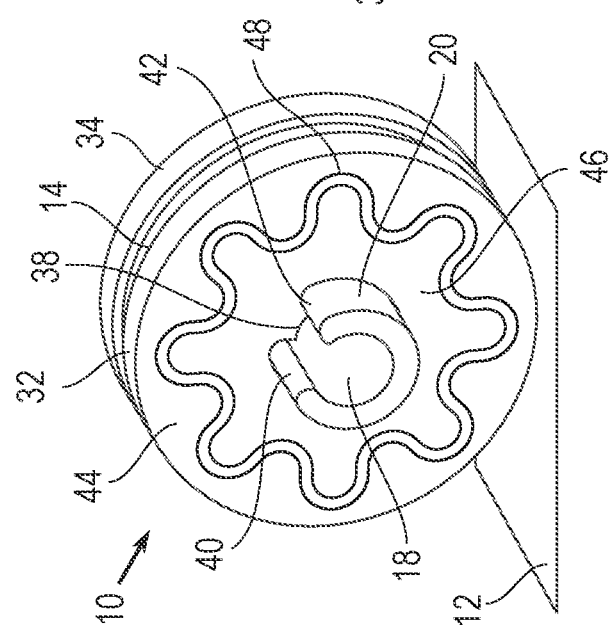
FIG. 1 is a diagram of a wheel, according to an embodiment.

Referring to FIGS. 1-13, the wheel 10 is configured to roll on a surface 12. Using the system and method described below, when the surface 12 is ferromagnetic, a magnetic flux generated by the wheel 10 can be controlled to increase or decrease magnetic adhesion of the wheel 10 to the ferromagnetic surface 12. As shown in FIGS. 1-2, the wheel 10 has an inner disc 14 having a pair of planar sides 16. The inner disc 14 is composed of a non-magnetic material. For example, the inner disc 14 can be composed of plastic. The inner disc 14 is preferably annular with a central axial bore 18 partially surrounded by a disc retainer 20, 22 extending perpendicularly from at least one of the planar sides 16. The central axial bore 18 is configured to receive an axle to roll the wheel 10 about the axle on the surface 12. A plurality of apertures 24, 26 extend perpendicularly and at least partially into at least one of the planar sides 16. A first plurality of apertures 24 are disposed adjacent to the first central axial bore and configured to retain a first plurality of magnets 28 as inner magnets. The magnets 28 are electromagnets which are activated by passing a current through the coils wrapped around a core. A second plurality of apertures 26 are disposed adjacent to the outer circumferential periphery and configured to retain a second plurality of magnets 30 as outer magnets. The magnets 30 can be permanent magnets. Alternatively, the magnets 30 can be electromagnets. The magnets 28, 30 are sized and dimensioned to be retained in the respective apertures 24, 26. In an example embodiment, the apertures 24, 26 are cylindrical, and the magnets 28, 30 are also cylindrical.

The wheel 10 also has at least one outer disc 32, 34 disposed adjacent to a respective planar side of the inner disc 14. Each outer disc 32, 34 is composed of a ferromagnetic material. For example, each outer disc 32, 34 can be composed of steel. Alternatively, each outer disc 32, 34 can be composed of nickel. In another alternative embodiment, each outer disc 32, 34 can be composed of cobalt. The outer discs 32, 34 can also be composed of other ferromagnetic materials. Each outer disc 32, 34 has a central axial bore 36 configured to receive a respective disc retainer 20, 22 through which an axle passes. The central axial bore 36 of each outer disc 32, 34 has a rotation stopper 38 for engaging radial sides 40, 42 of a respective disc retainer 20, 22. The radial sides 40, 42 limit the rotation of each outer disc 32, 34 relative to the inner disc 14 to a predetermined angle. The predetermined angle is equal to 180°/(the number of outer magnets on an outer circumferential periphery of the inner disc). For example, in an embodiment with eight outer magnets, the predetermined angle can be about 180°/8, which is about 22.5°. Using a different number of outer magnets would change the predetermined angle. For example, for ten outer magnets, the rotation angle can be about 180°/10, which is about 18°. It is also understood that other sizes and dimensions of the outer diameters of the discs as well as the aperture sizes are contemplated.

Referring again to FIGS. 1-2, each outer disc 32, 34 has an outer circumferential periphery 44 and an inner circumferential periphery 46 disposed adjacent to the central axial bore 36. An isolator ring 48 composed of a non-magnetic material and defining a plurality of curves extends in a serpentine manner circumferentially around the inner circumferential periphery 46 intermediate of the outer circumferential periphery 44 and the central axial bore 36, with the curves of the serpentine isolator ring 48 disposed between the inner circumferential periphery 46 and the outer circumferential periphery 44. The isolator ring 48 can be composed of plastic.

As described above, rotation of each outer disc 32, 34 can be performed relative to the inner disc 14 to within a predetermined angle. FIG. 3 illustrates outer discs 32, 34 of the wheel 10 rotating in a common direction relative to the inner disc 14. As shown in FIG. 3, the inner disc 14 can be motionless as the outer discs 32, 34 rotate in a common direction. FIG. 4 illustrates the outer discs 32, 34 of the wheel 10 rotating in opposite directions relative to the inner disc 14. As shown in FIG. 4, the inner disc 14 can be motionless as the outer discs 32, 34 rotate in opposite directions. FIG. 5 illustrates the inner disc 14 of the wheel 10 rotating relative to both of the outer discs 32, 34. As shown in FIG. 5, the inner disc 14 can be rotated as the outer discs 32, 34 remain motionless.

Figure 6:
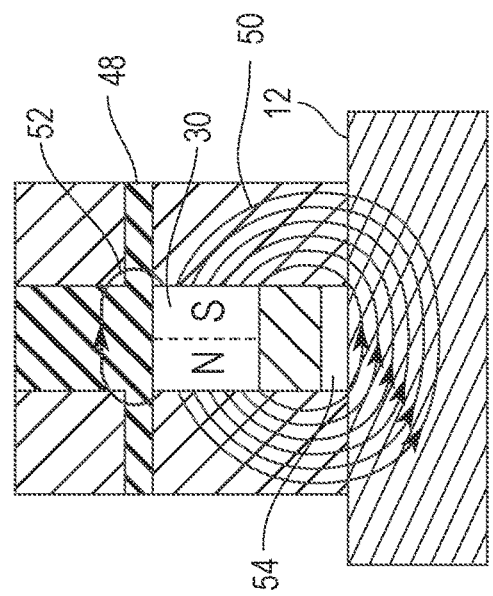
FIG. 6 is a cross-sectional view of the wheel of FIG. 1 in a first configuration.
Figure 8:
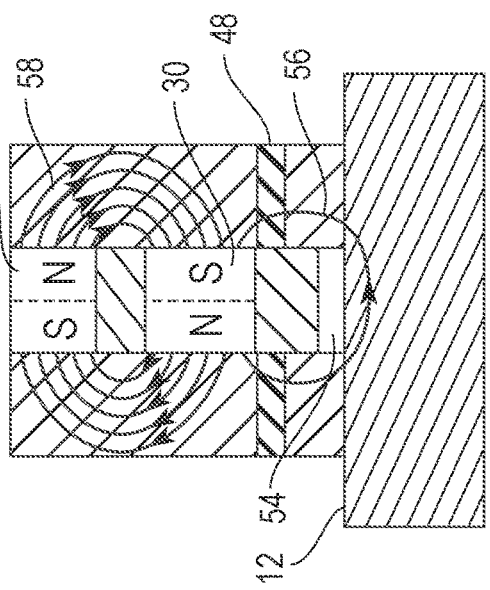
FIG. 8 is a cross-sectional view of the wheel of FIG. 1 in a second configuration.
Figure 7:
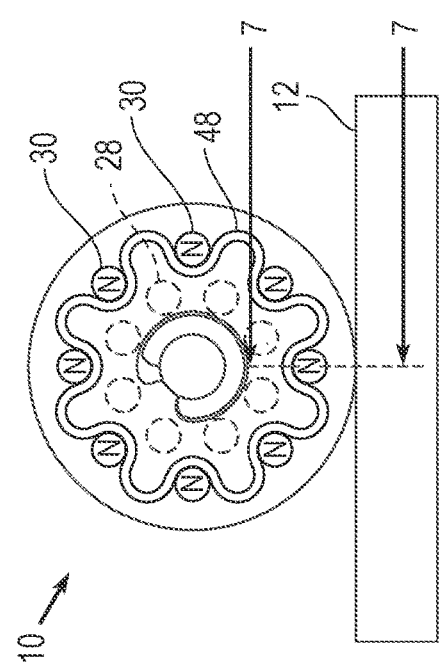
FIG. 7 illustrates the magnetic flux of the wheel in the first configuration of FIG. 6 along lines 7-7.
Figure 9:
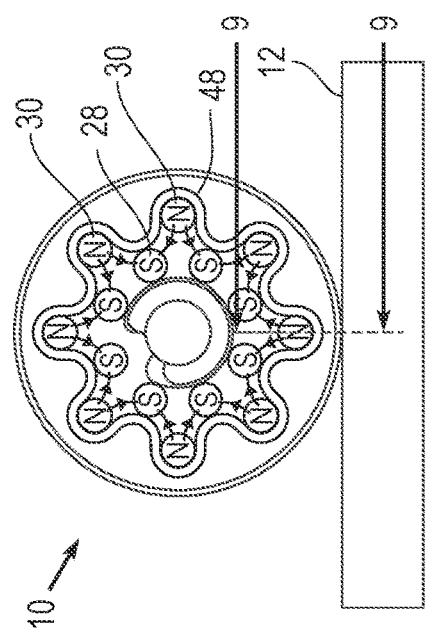
FIG. 9 illustrates the magnetic flux of the wheel in the second configuration of FIG. 8 along lines 9-9.

Regardless of the absolute motion of the inner disc 14 and the outer discs 32, 34, the relative motion of the discs 14, 32, 34 changes the wheel 10 from a first configuration, as shown in FIGS. 6-7, to a second configuration, as shown in FIG. 8-9. In the first configuration, the curves of the serpentine isolator ring 48 are disposed in a first position relative to the second plurality of magnets 30 to isolate the first plurality of magnets 28 from the second plurality of magnets 30, thereby generating a first magnetic flux 50 between the second plurality of magnets and the ferromagnetic surface 12 to increase the adhesion of the wheel to the ferromagnetic surface 12. The first magnetic flux 50 can be increased by not activating the electromagnets 28. A weaker magnetic flux 52 is also generated. An air gap 54 is formed between the inner disc 14 and the ferromagnetic surface 12.

In the second configuration, at least one outer annular disc 32, 34 is rotated about the axle relative to the inner annular disc 14 to dispose the curves of the serpentine isolator ring 48 in a second position relative to the second plurality of magnets 30 to allow magnetic interaction between the first plurality of magnets 28 and the second plurality of magnets 30, thereby generating a second magnetic flux 56 between the second plurality of magnets 30 and the ferromagnetic surface 12 to decrease the adhesion of the wheel 10 to the ferromagnetic surface 12. A stronger magnetic flux 58 is also generated between the magnets 28, 30. The stronger magnetic flux 58 can be increased by activation of the electromagnets 28 simultaneous with rotation of the at least one outer annular discs 32, 34. However, the second magnetic flux 56 is less than the first magnetic flux 50 shown in FIG. 7, so there is less adhesion of the wheel 10 to the ferromagnetic surface 12.

In an alternative embodiment shown in FIGS. 10-11, the wheel 110 has an inner annular disc 114 with apertures 126 configured to retain a plurality of magnets 130. Each of the plurality of magnets 130 can be a permanent magnet. An annular electromagnet 128 is disposed in the center of the inner annular disc 114. For example, the annular electromagnet 128 can be embedded in the center of the inner annular disc 114 surrounding the central axial bore 118. As described above with regarding to FIGS. 6-9, the annular electromagnet 128 can be activated simultaneous with rotation of at least one of the outer annular discs 32, 34 to cancel the magnetic field of the magnets 130, allowing the wheel 110 to detach from the ferromagnetic surface 12.

Figure 13:
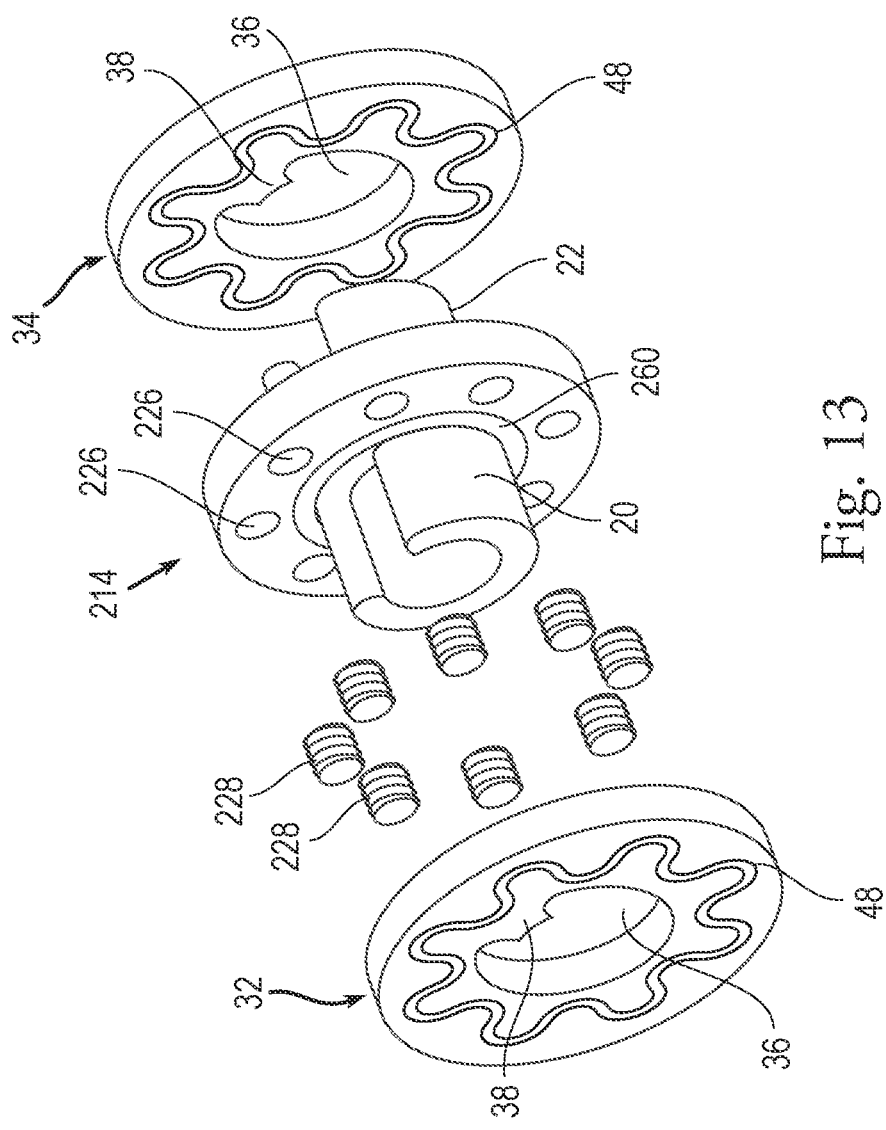
FIGS. 12-13 illustrate another alternative embodiment of the wheel of FIGS. 1-2.
Figure 12:
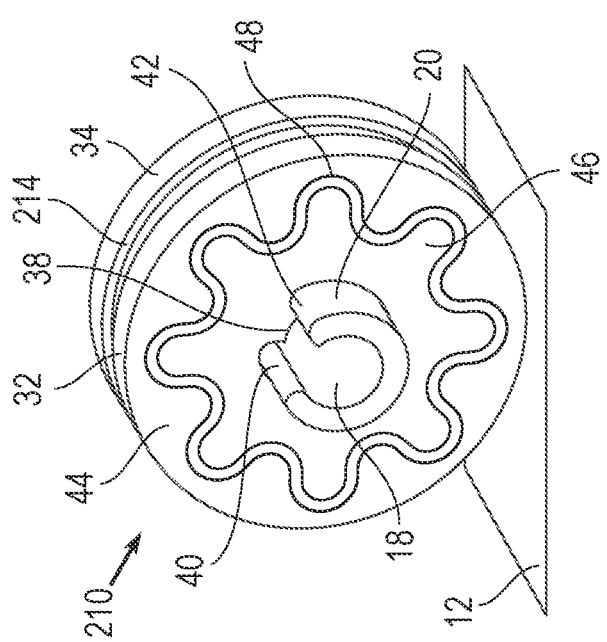

In another alternative embodiment shown in FIGS. 12-13, the wheel 210 has an inner annular disc 214 with apertures 226 configured to retain a plurality of electromagnets 228. Each of the electromagnets 228 can be a ferromagnetic core with a coil wrapped around the core. The ferromagnetic core is a permanent magnet. The inner annular disc 214 also includes a ferromagnetic conductor ring 260. The ferromagnetic conductor ring 260 can be composed of steel. As described above with regarding to FIGS. 6-9, the coils of the electromagnets 228 can be activated simultaneous with rotation of at least one of the outer annular discs 32, 34 to cancel the magnetic field of the cores of the electromagnets 228. When the electromagnets 228 are turned on, the ferromagnetic conductor ring 260 reduces the magnetic flux between the permanent magnets of the cores and the ferromagnetic surface 12, allowing the wheel 210 to detach from the ferromagnetic surface 12.

Figure 14:
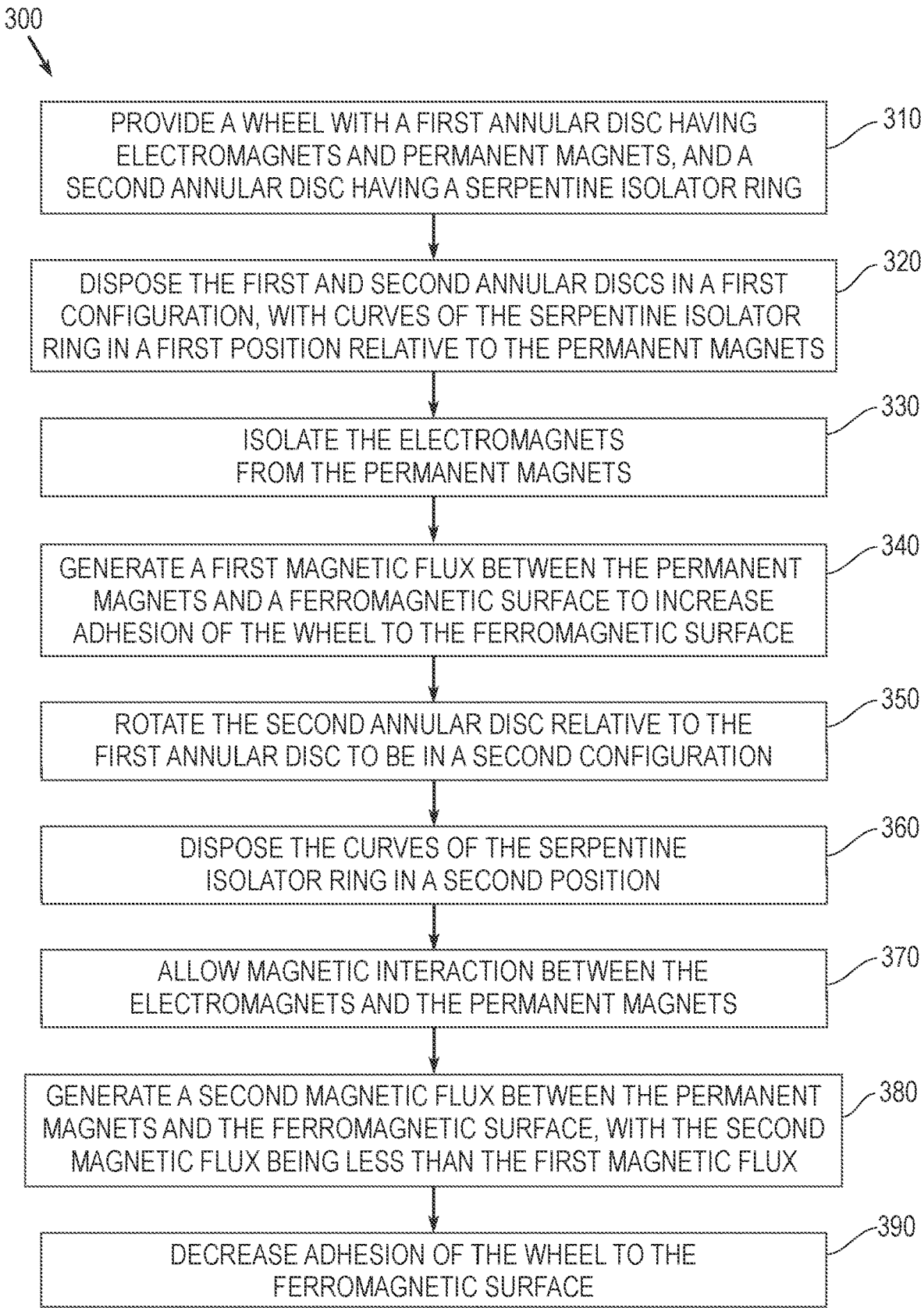
FIG. 14 is a flowchart of the method of operation of the wheel of FIGS. 1 and 10-11.

As shown in FIG. 14, a method 300 includes the step of providing the wheel 10 in step 310, with the wheel 10 having a first annular disc retaining electromagnets and permanent magnets, and having a second annular disc with a serpentine isolator ring. The method 300 then disposes the first and second annular discs in a first configuration in step 320 with curves of the serpentine isolator ring in a first position relative to the magnets. The method 300 then isolates the electromagnets from the permanent magnets in step 330, and generates a first magnetic flux between the permanent magnets and a ferromagnetic surface in step 340 to increase the adhesion of the wheel to the ferromagnetic surface. The method 300 then rotates the second annular disc relative to the first annular disc to be in a second configuration in step 350, and disposes the curves of the serpentine isolator ring in a second position in step 360. The method 300 then allows magnetic interaction between the electromagnets and the permanent magnets in step 370, and generates a second magnetic flux between the permanent magnets and the ferromagnetic surface in step 380, with the second magnetic flux being less than the first magnetic flux. The method 300 then decreases the adhesion of the wheel to the ferromagnetic surface in step 390.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be conducted in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for conducting this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A wheel having an axle and configured to adhere magnetically to a ferromagnetic surface, comprising:
    an inner annular disc composed of a non-magnetic material and having:
        a first outer circumferential periphery;
        a first central axial bore configured to retain the axle;
        a first plurality of apertures disposed adjacent to the central axial bore and configured to retain a first plurality of magnets, wherein each of the first plurality of magnets is an electromagnet; and
        a second plurality of apertures disposed adjacent to the outer circumferential periphery and configured to retain a second plurality of magnets; and
    a pair of outer annular discs composed of a ferromagnetic material and disposed on either side of the inner annular disc, with each outer annular disc having:
        a second outer circumferential periphery;
        a second central axial bore configured to retain the axle;
        an inner circumferential periphery disposed adjacent to the second central axial bore; and
        an isolator ring composed of a non-magnetic material and defining a plurality of loops disposed between the inner circumferential periphery and the second outer circumferential periphery,
    wherein in a first configuration, the plurality of loops is disposed in a first position relative to the second plurality of magnets to isolate the first plurality of magnets from the second plurality of magnets, thereby generating a first magnetic flux between the second plurality of magnets and the ferromagnetic surface to increase the adhesion of the wheel to the ferromagnetic surface, and
    wherein in a second configuration, at least one outer annular disc is rotated about the axle relative to the inner annular disc to dispose the plurality of loops in a second position relative to the second plurality of magnets to allow magnetic interaction between the first plurality of magnets and the second plurality of magnets, thereby generating a second magnetic flux between the second plurality of magnets and the ferromagnetic surface to decrease the adhesion of the wheel to the ferromagnetic surface,
    wherein the second magnetic flux is less than the first magnetic flux.

2. The wheel of claim 1, wherein each of the first plurality of magnets has a first polarity, and
    wherein each of the second plurality of magnets has a second polarity opposite to the first polarity.

3. The wheel of claim 1, wherein in the second configuration, the first plurality of magnets at least partially cancels the magnetic flux of the second plurality of magnets.

4. The wheel of claim 1, wherein the second plurality of magnets are permanent magnets.

5. The wheel of claim 1, wherein the first and second pluralities of apertures are cylindrical.

6. The wheel of claim 5, wherein each of the first plurality of magnets are cylindrical.

7. The wheel of claim 5, wherein each of the second plurality of magnets are cylindrical.

8. A wheel having an axle and configured to adhere magnetically to a ferromagnetic surface, comprising:
    a first annular disc composed of a non-magnetic material and having:
        a first outer circumferential periphery;
        a first central axial bore configured to retain the axle;
        a first plurality of apertures disposed adjacent to the central axial bore and configured to retain a first plurality of magnets, wherein each of the first plurality of magnets is an electromagnet; and a second plurality of apertures disposed adjacent to the outer circumferential periphery and configured to retain a second plurality of magnets; and a second annular disc composed of a ferromagnetic material and disposed on one side of the first annular disc, with the second annular disc having:

a second outer circumferential periphery;

a second central axial bore configured to retain the axle;

an inner circumferential periphery disposed adjacent to the second central axial bore; and an isolator ring composed of a non-magnetic material and defining a plurality of loops disposed between the inner circumferential periphery and the second outer circumferential periphery, wherein in a first configuration, the plurality of loops is disposed in a first position relative to the second plurality of magnets to isolate the first plurality of magnets from the second plurality of magnets, thereby generating a first magnetic flux between the second plurality of magnets and the ferromagnetic surface to increase the adhesion of the wheel to the ferromagnetic surface, and wherein in a second configuration, the second annular disc is rotated about the axle relative to the first annular disc to dispose the plurality of loops in a second position relative to the second plurality of magnets to allow magnetic interaction between the first plurality of magnets and the second plurality of magnets, thereby generating a second magnetic flux between the second plurality of magnets and the ferromagnetic surface to decrease the adhesion of the wheel to the ferromagnetic surface, wherein the second magnetic flux is less than the first magnetic flux.

9. The wheel of claim 8, wherein each of the first plurality of magnets has a first polarity, and wherein each of the second plurality of magnets has a second polarity opposite to the first polarity.

10. The wheel of claim 8, wherein in the second configuration, the first plurality of magnets at least partially cancels the magnetic flux of the second plurality of magnets.

11. The wheel of claim 8, wherein the second plurality of magnets are permanent magnets.

12. The wheel of claim 8, wherein the first and second pluralities of apertures are cylindrical.

13. The wheel of claim 12, wherein each of the first plurality of magnets is cylindrical.

14. The wheel of claim 12, wherein each of the second plurality of magnets is cylindrical.

15. A method of adhering a wheel magnetically to a ferromagnetic surface, comprising:

providing a wheel having an axle, a first annular disc, and a second annular disc, wherein the first annular disc is composed of a non-magnetic material and having:

a first outer circumferential periphery;

a first central axial bore configured to retain the axle;

a first plurality of apertures disposed adjacent to the central axial bore and configured to retain a first plurality of magnets, wherein each of the first plurality of magnets is an electromagnet; and a second plurality of apertures disposed adjacent to the outer circumferential periphery and configured to retain a second plurality of magnets; and wherein the second annular disc is composed of a ferromagnetic material and disposed on one side of the first annular disc, with the outer annular disc having:

a second outer circumferential periphery;

a second central axial bore configured to retain the axle;

an inner circumferential periphery disposed adjacent to the second central axial bore; and an isolator ring composed of a non-magnetic material and defining a plurality of loops disposed between the inner circumferential periphery and the second outer circumferential periphery;

disposing the first and second annular discs in a first configuration wherein the plurality of loops are disposed in a first position relative to the second plurality of magnets;

isolating the first plurality of magnets magnetically from the second plurality of magnets; and generating a first magnetic flux between the second plurality of magnets and the ferromagnetic surface thereby increasing the adhesion of the wheel to the ferromagnetic surface.

16. The method of claim 15, further comprising:

disposing the first and second annular discs in a second configuration, wherein the second annular disc is rotated about the axle relative to the first annular disc;

disposing the plurality of loops in a second position relative to the second plurality of magnets;

allowing magnetic interaction between the first plurality of magnets and the second plurality of magnets; and generating a second magnetic flux between the second plurality of magnets and the ferromagnetic surface to decrease the adhesion of the wheel to the ferromagnetic surface, wherein the second magnetic flux is less than the first magnetic flux.

17. The method of claim 15, wherein each of the first plurality of magnets has a first polarity, and wherein each of the second plurality of magnets has a second polarity opposite to the first polarity.

18. The method of claim 15, wherein the second plurality of magnets are permanent magnets.

19. The method of claim 15, wherein the first and second pluralities of apertures are cylindrical.

20. The method of claim 19, wherein each of the first plurality and second plurality of magnets is cylindrical.

* * * * *